United States Patent
Frey et al.

(10) Patent No.: US 11,291,163 B2
(45) Date of Patent: Apr. 5, 2022

(54) APPARATUS AND METHODS FOR REMOVING NET WRAP FROM A BALE

(71) Applicant: 1708828 Ontario Limited

(72) Inventors: Ryan Earl Frey, Listowel (CA); Oscar Frey, Listowel (CA); Marvin Martin, Wellesley (CA)

(73) Assignee: 1708828 Ontario Ltd., Listowel (CA)

( * ) Notice: Subject to any disclaimer, the term of this patent is extended or adjusted under 35 U.S.C. 154(b) by 0 days.

(21) Appl. No.: 17/006,433

(22) Filed: Aug. 28, 2020

(65) Prior Publication Data

US 2021/0059120 A1   Mar. 4, 2021

Related U.S. Application Data

(60) Provisional application No. 62/894,378, filed on Aug. 30, 2019.

(51) Int. Cl.
*A01D 87/12* (2006.01)

(52) U.S. Cl.
CPC ...... *A01D 87/127* (2013.01); *A01D 2087/128* (2013.01)

(58) Field of Classification Search
CPC ............ A01D 87/127; A01D 2087/128; A01D 34/13; B65B 69/0033; B65B 69/0008; B65B 69/0025; A01K 5/00; Y10T 83/889; Y10S 83/928; Y10S 414/124; Y10S 241/605
USPC ................................ 414/24.5, 24.6, 111, 412
See application file for complete search history.

(56) References Cited

U.S. PATENT DOCUMENTS

| | | | | |
|---|---|---|---|---|
| 3,241,695 | A * | 3/1966 | Bishop | A01D 87/126 414/739 |
| 5,374,156 | A * | 12/1994 | Simpson | B66F 9/125 414/667 |
| 6,820,836 | B2 * | 11/2004 | Sato | B65H 19/1852 156/504 |
| 7,165,928 | B2 * | 1/2007 | Haverdink | B65B 69/0033 414/303 |

(Continued)

FOREIGN PATENT DOCUMENTS

| | | | | |
|---|---|---|---|---|
| FR | 2918536 A1 * | 1/2009 | | A01D 87/127 |
| FR | 3040857 A1 * | 3/2017 | | A01D 87/127 |

(Continued)

OTHER PUBLICATIONS fr_3040857_english_translation_17006433.pdf (Year: 2017).*

*Primary Examiner* — Gregory W Adams
(74) *Attorney, Agent, or Firm* — Bereskin & Parr LLP

(57) ABSTRACT

Apparatus and methods for removing net wrap from a bale are described herein. The apparatus includes a frame configured to releasably mount to a vehicle and first and second opposed arms movably coupled to the frame. At least one of the first and second opposed arms moves between a retracted position where the arms support the bale and an extended position where the bale passes between the arms and falls downwardly. The apparatus also includes a cutting mechanism including a cutting element configured to cut the net wrap. The apparatus further includes at least one grabbing mechanism coupled to at least one of the first arm and the second arm to retain the net wrap after the net wrap has been cut by the cutting mechanism and the bale falls downwardly between the arms.

19 Claims, 12 Drawing Sheets

(56) References Cited

U.S. PATENT DOCUMENTS

2010/0111647 A1* 5/2010 Noonan .................... B66F 9/18
                                                          414/24.5
2018/0016049 A1   1/2018 Schmitz et al.
2021/0051857 A1   2/2021 Smith et al.

FOREIGN PATENT DOCUMENTS

WO       2006118469 A1    11/2006
WO    WO-2015091377 A1 *  6/2015  ........... A01F 29/005

* cited by examiner

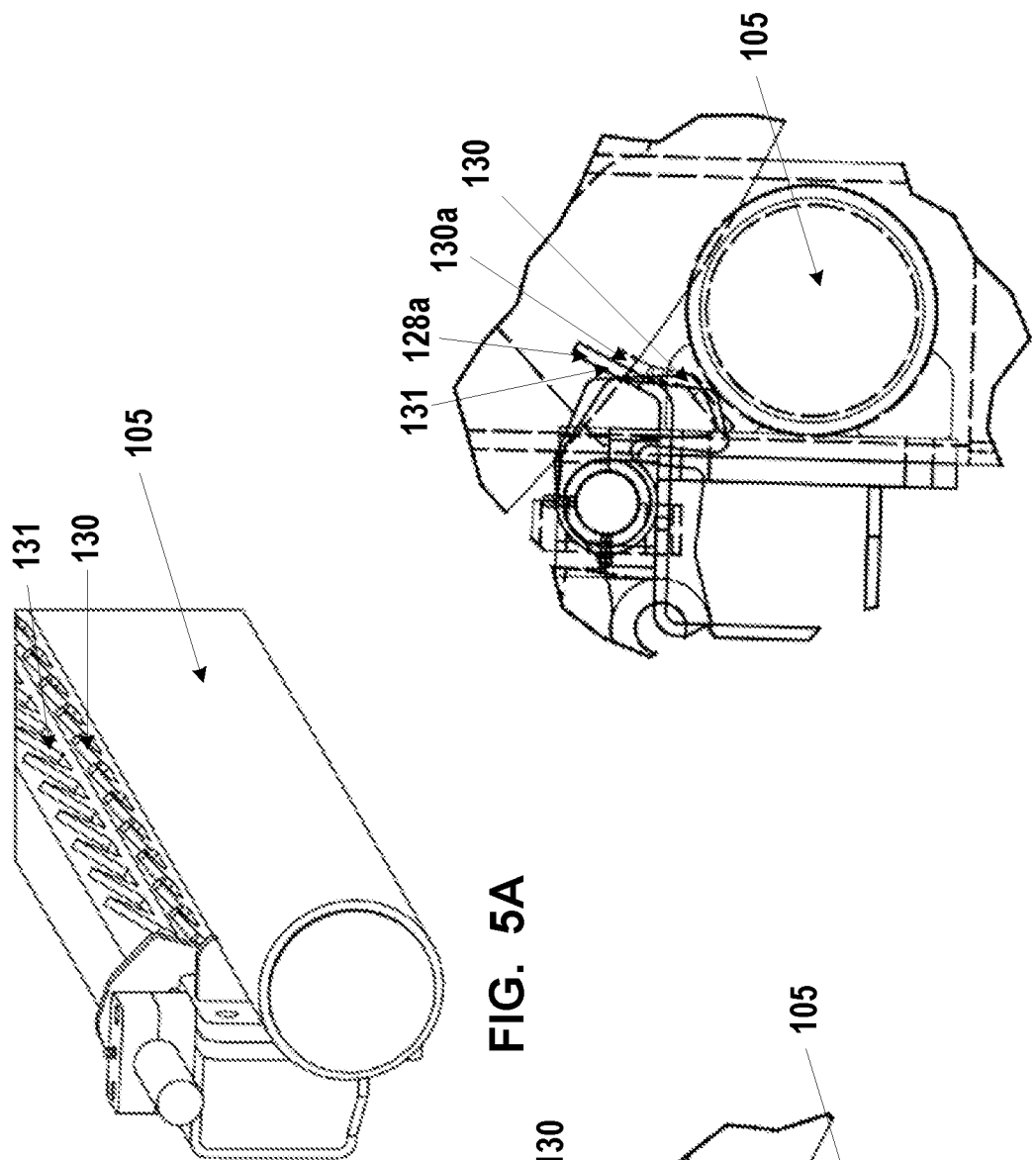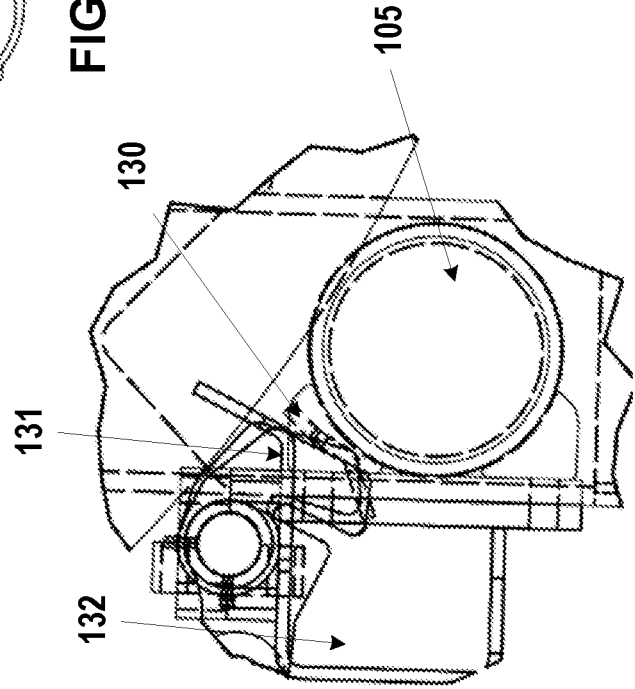

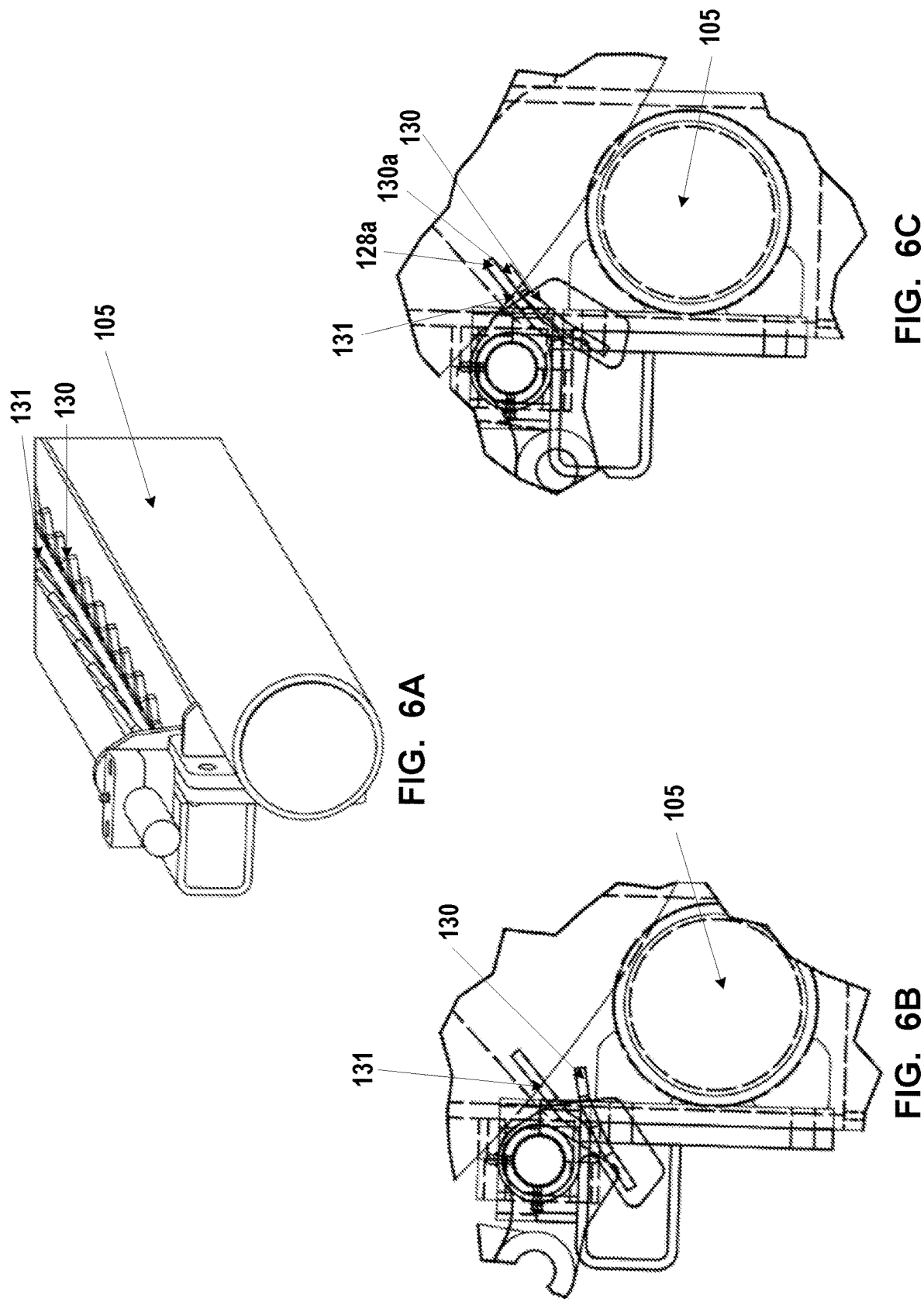

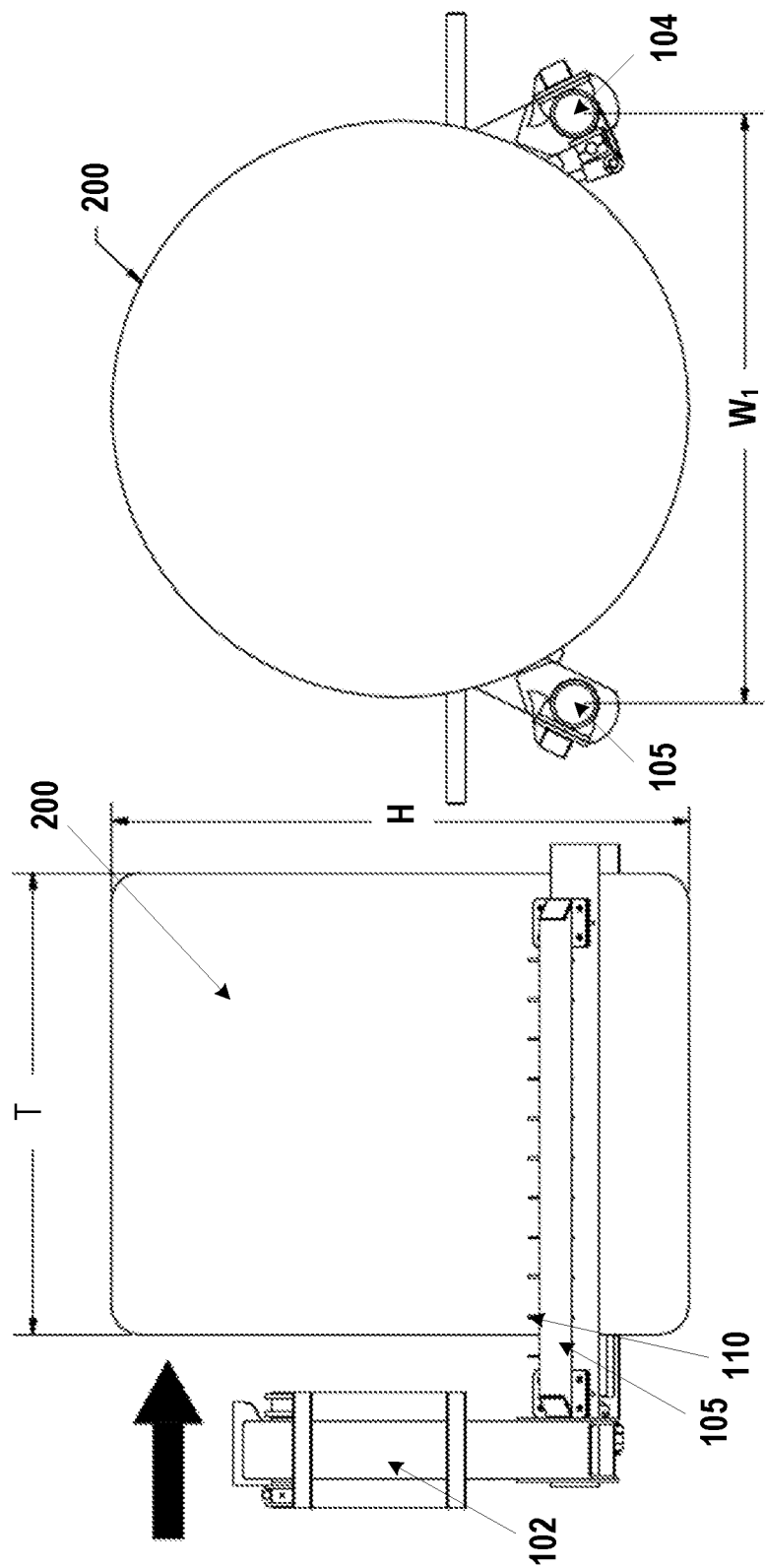

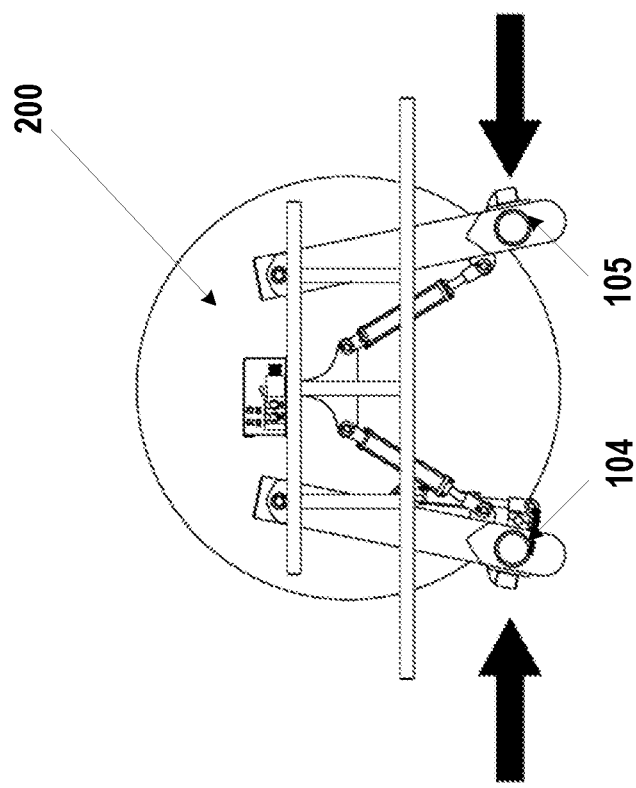
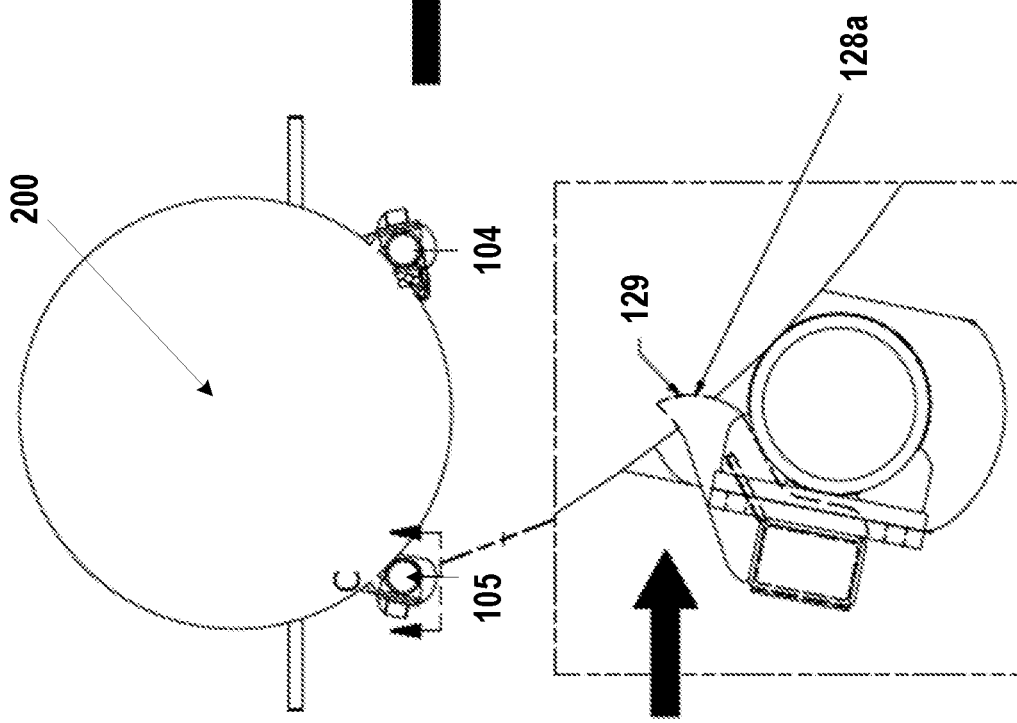
FIG. 9B
FIG. 9A

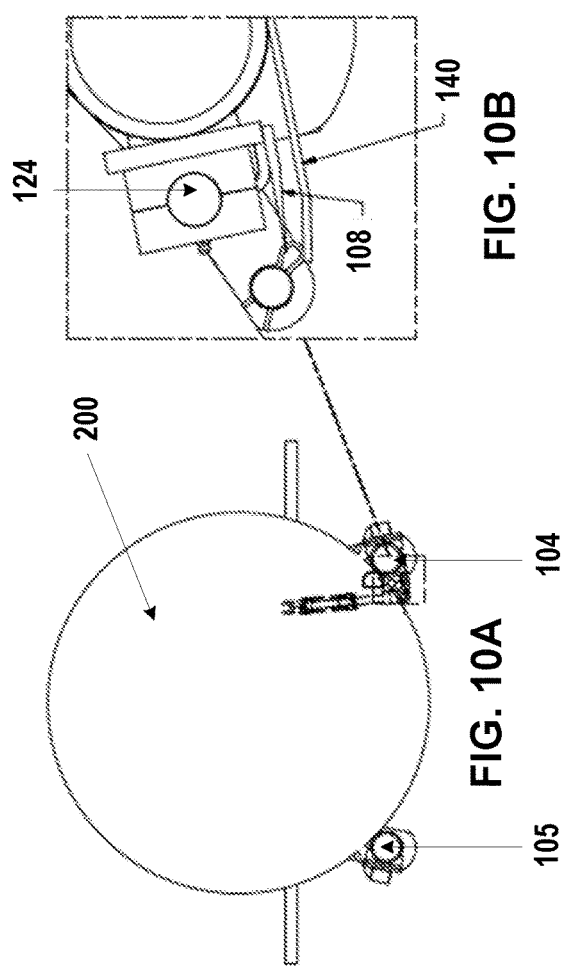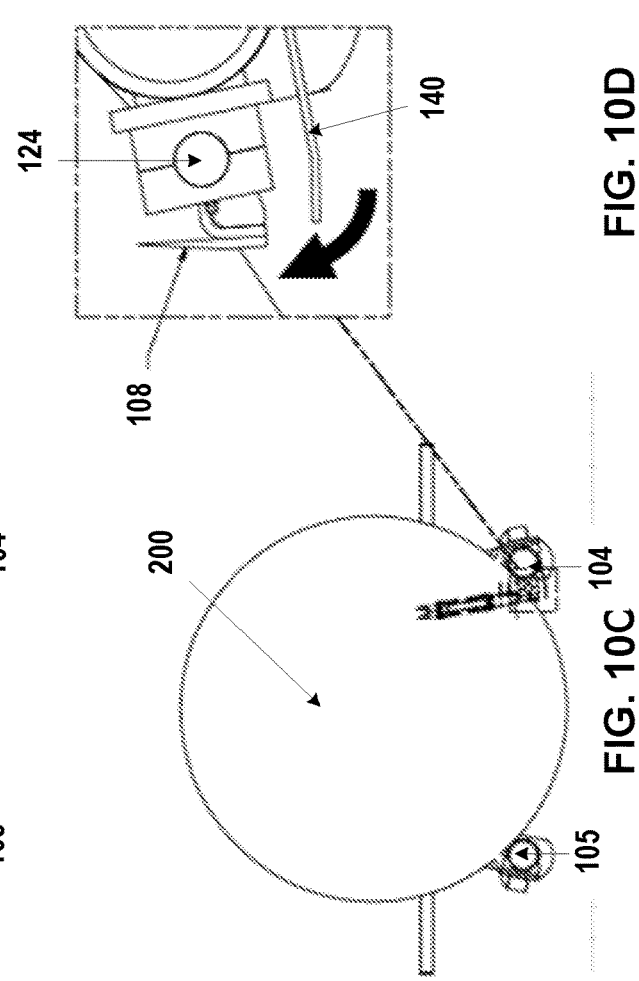

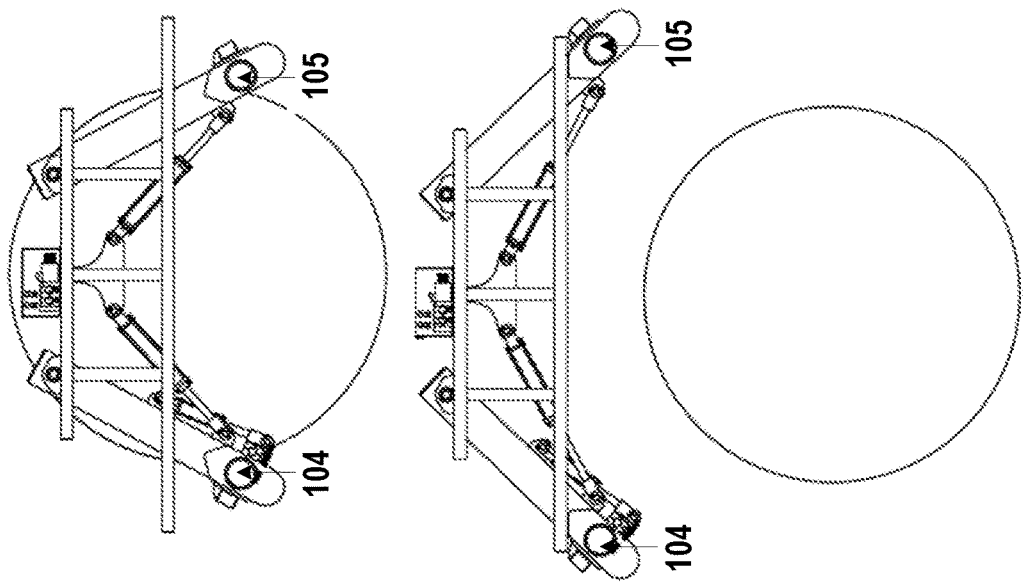
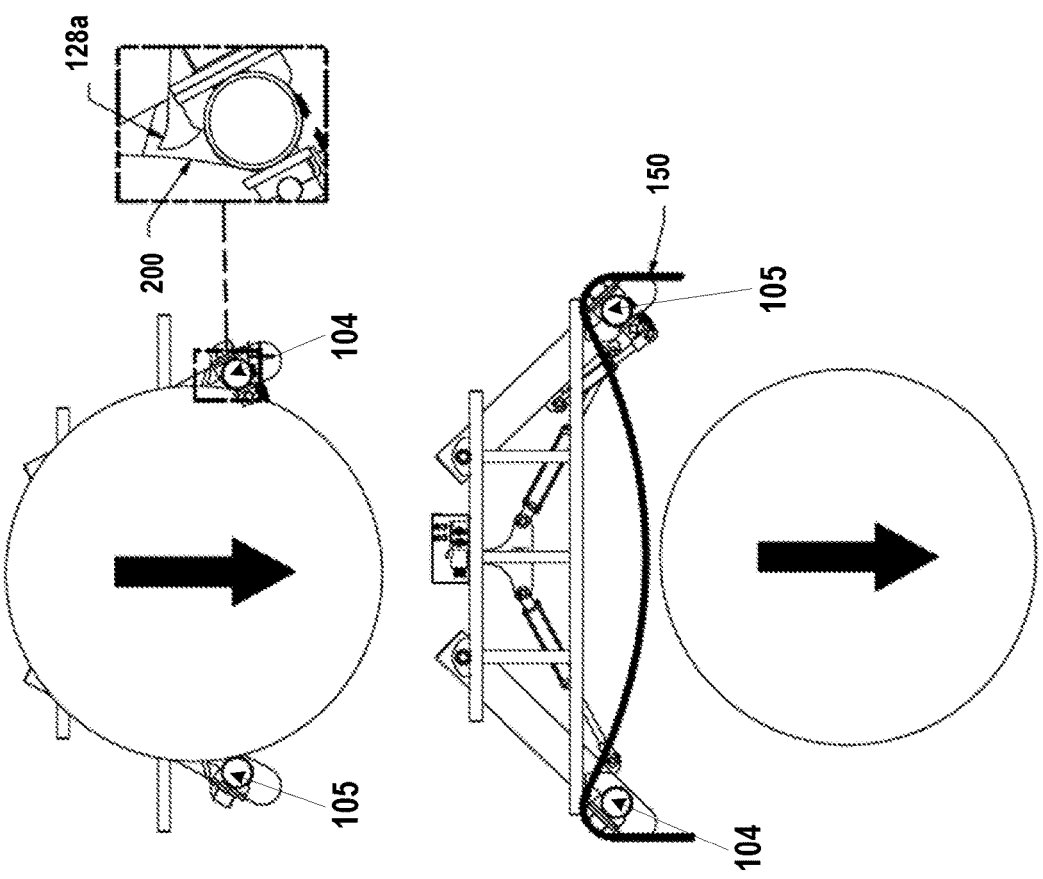

APPARATUS AND METHODS FOR REMOVING NET WRAP FROM A BALE

CROSS REFERENCE

This application claims the benefit of U.S. Provisional Patent Application No. 62/894,378 entitled "Apparatus and Methods for Removing Net Wrap from a Bale" filed Aug. 30, 2019. The entire contents of this application is hereby incorporated by reference herein in its entirety for all purposes.

TECHNICAL FIELD

The embodiments disclosed herein relate to apparatus and methods for processing bales, and more specifically to apparatus and methods for removing net wrap from bales.

BACKGROUND

Wrapping individual bales of field crops (e.g. hay, straw, silage or any other field crop that gets baled into bales) with a material, such as net wrap or another wrapping material, provides for producers to easily transport bales and to reduce the amount of field crop lost to spoilage.

Previously, field crop producers wrapped bales in sisal twine that could rot away over time and lead to spoilage of the field crop. However, net wrap that is made of woven plastic does not degrade or decompose and its use by producers has reduced spoilage.

Unfortunately, net wrap made of woven plastic can clutter processing machinery if not removed and, if consumed, harm livestock. Consumption of plastic net wrap can block the intestinal tract and/or decrease the stomach capacity of livestock because it does not decompose or break down.

Removing net wrap from bales of field crops can be a strenuous and potentially dangerous activity for livestock producers. To remove net wrap, an operator must dismount from a machine used for transporting the bale, cut the net wrap, remove the net wrap from the bale, collect the net wrap, and then remount the machine to finish feeding the bale into further processing machinery. Ideally, the net wrap can be removed from the bale by the operator without the operator having to dismount the machine.

Accordingly, there is a need for an apparatus that removes net wrap from bales and does not require an operator to dismount from a machine.

SUMMARY

According to at least one aspect, an apparatus for removing net wrap from a bale is described herein. The apparatus includes a frame configured to releasably mount to a vehicle and first and second opposed arms coupled to the frame. At least one of the first and second opposed arms is configured to move between a retracted position where the first and second support arms receive and support the bale and an extended position where the bale passes between the support arms and falls downward. The apparatus also includes a cutting mechanism movably coupled to the first arm, the cutting mechanism including a cutting element, the cutting element being configured to move relative to the first arm to cut the net wrap. The apparatus also includes at least one grabbing mechanism coupled to the first arm or the second arm, the at least one grabbing mechanism being configured to retain the net wrap after the net wrap has been cut by the cutting mechanism and the at least one of the first and second opposed arms moves from the retracted position towards the extended position and the bale falls downward.

According to at least one aspect, an apparatus for removing net wrap from a bale is described herein. The apparatus includes a frame configured to releasably mount to a vehicle; first and second opposed arms movably coupled to the frame, at least one of the first and second opposed arms being configured to move between a retracted position where the first and second support arms receive and support the bale and an extended position where the bale passes between the support arms and falls downward; a cutting mechanism movably coupled to the first arm, the cutting mechanism including a cutting element, the cutting element being configured to pivotally move between a lowered position where the cutting element is spaced from the bale and a raised position where the cutting element engages the net wrap and cuts the net wrap; and first and second grabbing mechanisms, the first grabbing mechanism being coupled to the first arm and the second grabbing mechanism being coupled to the second arm, each of the first and second grabbing mechanisms being configured to retain the net wrap after the net wrap has been cut by the cutting mechanism and the at least one of the first and second opposed arms moves from the retracted position towards the extended position and the bale falls downward.

In some embodiments, the cutting element is configured to rotate about an axis defined by the length of the first arm to move from the lowered position to the raised position.

In some embodiments, the cutting element extends along a length of the first arm.

In some embodiments, the cutting element includes a plurality of individual cutting knives that are aligned with each other.

In some embodiments, each of the first arm and the second arm is configured to move between the retracted position where the first and second support arms are spaced apart by a first distance that is less than a diameter of the bale and the extended position where first and second support arms are spaced apart by a distance that is greater than the diameter of the bale.

In some embodiments, the first grabbing mechanism extends along the first arm and the second grabbing mechanism extends along the second arm.

In some embodiments, the first grabbing mechanism is fixedly coupled to the first arm and the second grabbing mechanism is fixedly coupled to the second arm.

In some embodiments, the cutting element is configured to cut the net wrap at a position between the first arm and the second arm when the bale is supported on the first arm and the second arm.

In some embodiments, the cutting mechanism is configured on the first arm to cut the net wrap at a position between the first grabbing mechanism and the second grabbing mechanism when the bale is supported on the first arm and the second arm.

In some embodiments, the cutting mechanism includes a cutting cylinder for pivotally moving the cutting element relative to the first arm to cut the net wrap.

In some embodiments, the cutting cylinder is fixedly coupled to an upper portion of the first arm.

In some embodiments, the apparatus further includes a first cylinder and a second cylinder, the first cylinder being pivotally coupled to the frame and to the first arm to move the first arm between the retracted position and the extended position and the second cylinder being pivotally coupled to the frame and to the second arm to move the second arm between the retracted position and the extended position.

In some embodiments, the at least one grabbing mechanism includes a movable grabbing element and a stationary grabbing element, the moveable grabbing element movable between a first position and a second position to retain the net wrap between the movable grabbing element and the stationary grabbing element.

In some embodiments, the movable grabbing element rotates to move between the first position and the second position.

In another aspect, a method of removing net wrap from a bale is described herein. The method includes supporting the bale on first and second arms of an apparatus, the first and second arms being spaced apart by a distance that is less than a diameter of the bale, the first and second arms each having a grabbing mechanism fixedly coupled thereto; cutting the net wrap with the cutting mechanism of the apparatus, the cutting mechanism having a cutting element that is movably coupled to the first arm; pivoting at least one of the first and second arms in a direction away from the other of the first and second arms to increase the distance that the first and second arms are spaced apart; and retaining the net wrap on each of the grabbing mechanisms as the bale falls downwardly between the first and second arms.

In some embodiments, cutting the net wrap includes cutting the net wrap along a width of the bale.

In some embodiments, cutting the net wrap includes pivoting the cutting element relative to the first arm between a lowered position where the cutting element is spaced from the bale and a raised position where the cutting element engages the net wrap and cuts the net wrap wrapped around the bale.

In some embodiments, cutting the net wrap includes pivoting the cutting element relative to the first arm by actuating a cutting cylinder coupled to the first arm.

In some embodiments, pivoting at least one of the first and second arms in the direction away from the other of the first and second arms includes pivoting at least one of the first and second arms by actuating a first cylinder pivotally coupled to the frame.

In some embodiments, pivoting at least one of the first and second arms in the direction away from the other of the first and second arms includes pivoting each of the first and second arms in a direction away from the other of the first and second arms.

In some embodiments, pivoting each of the first and second arms in a direction away from the other of the first and second arms includes pivoting the first arm by actuating a first cylinder pivotally coupled to the frame and pivoting a second arm by actuating a second cylinder pivotally coupled to the frame.

In some embodiments, supporting the bale on first and second arms of an apparatus includes supporting the bale on first and second arms of the apparatus such that the grabbing mechanisms abut the net wrap.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 5A shows an elevated perspective view of a portion of an arm of a cutting apparatus for removing net wrap from around a bale, according to at least one embodiment;

FIG. 5B shows a front view of the arm of FIG. 5A at a first position, according to at least one embodiment;

FIG. 5C shows a front view of the arm of FIG. 5A at a second position, according to at least one embodiment;

FIG. 6A shows an elevated perspective view of a portion of an arm of a cutting apparatus for removing net wrap from around a bale, according to at least one embodiment;

FIG. 6B shows a front view of the arm of FIG. 5A at a first position, according to at least one embodiment;

FIG. 6C shows a front view of the arm of FIG. 5A at a second position, according to at least one embodiment;

FIG. 8A shows a side view of the apparatus of FIG. 1 with a bale supported on the first and second arms when the opposed arms are each in their retracted position;

FIG. 8B shows a front view of the apparatus of FIG. 1 with a bale supported on the first and second arms when the opposed arms are each in their retracted position;

FIG. 9A shows a front view and a magnified front view of a portion of the apparatus of FIG. 1 with a bale supported on the first and second arms when the opposed arms are each in their retracted position;

FIG. 9B shows a rear view of the apparatus of FIG. 1 with a bale supported on the first and second arms when the opposed arms are each in their retracted position;

FIG. 10A shows a front view of the apparatus of FIG. 1 with a bale supported on the first and second arms when the opposed arms are each in their retracted position and a cutting element of a cutting mechanism of the apparatus is in a lowered position;

FIG. 10B shows a magnified front view of the apparatus of FIG. 1 with a bale supported on the first and second arms when the opposed arms are each in their retracted position and a cutting element of a cutting mechanism of the apparatus is in a lowered position;

FIG. 10C shows a front view of the apparatus of FIG. 1 with a bale supported on the first and second arms when the opposed arms are each in their retracted position and a cutting element of a cutting mechanism of the apparatus is in a raised position;

FIG. 10D shows a magnified front view of the apparatus of FIG. 1 with a bale supported on the first and second arms when the opposed arms are each in their retracted position and a cutting element of a cutting mechanism of the apparatus is in a raised position;

FIG. 12A shows a front view of the apparatus of FIG. 1 with a bale supported on the first and second arms when the opposed arms are each moving towards their extended position;

FIG. 12B shows a rear view of the apparatus of FIG. 1 with a bale supported on the first and second arms when the opposed arms are each moving towards their extended position;

FIG. 12C shows a front view of the apparatus of FIG. 1 with a bale passing through the first and second arms when the arms are each in their second extended; and FIG. 12D shows a rear view of the apparatus of FIG. 1 with a bale passing through the first and second arms when the arms are each in their extended position.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various apparatus and methods will be described below to provide an example of each claimed embodiment. No embodiment described below limits any claimed embodiment and any claimed embodiment may cover apparatus or methods that differ from those described below. The claimed embodiments are not limited to apparatus or methods having all of the features of any one apparatus or method described below or to features common to multiple or all of the apparatus or methods described below.

Generally, apparatus and methods of removing net wrap from bales are described herein. It should be understood that although the bales are commonly referred to as hay bales herein, the apparatus and methods described herein may by used to remove net wrap from bales of other materials, as well, such as but not limited to straw, silage or any other field crop that gets baled into bales.

Generally, the bales considered herein and illustrated in the figures are round bales, however, it will be appreciated that the apparatus and methods described herein may be adapted for use with bales of various sizes, shapes and configurations. For instance, without limiting the foregoing, the apparatus and methods of removing net wrap from bales described herein may be adapted for use with round bales with diameters of 4 feet, 5 feet, 6 feet or more and with a thickness of 4 feet or 5 feet or more.

Additionally, while the material discussed herein to be removed from the bales is generally referred to as net wrap, or simply netting, the apparatus and methods described herein may be adapted for removing various other types of material from bales including but not limited to, plastic sheet wrapping, film, twine and other materials commonly used to wrap bales.

Figure 1:
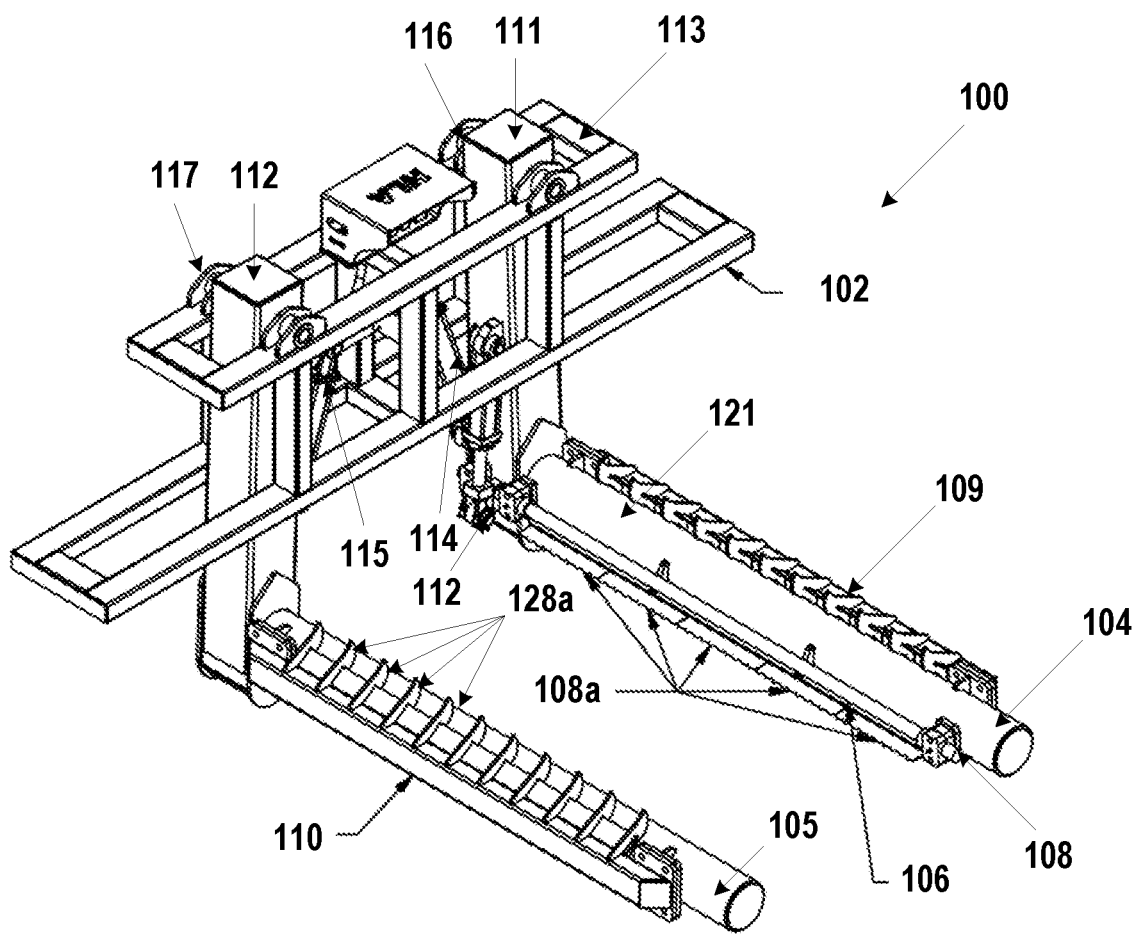
FIG. 1 shows an elevated perspective view of an apparatus for removing net wrap from around a bale, according to one embodiment.

Referring now to FIG. 1, illustrated therein is an apparatus 100 that includes a frame 102, first and second opposed arms 104 and 105, respectively, a cutting mechanism 106 and first and second grabbing mechanisms 109 and 110, respectively.

Frame 102 is configured to releasably mount to a vehicle such as but not limited to a tractor, a skid steer, a front-end loader or another suitable piece of equipment for lifting and/or transporting bales. In some embodiments, apparatus 100 may be releasably mounted to a piece of equipment by, for example, a quick attach coupler (not shown) or another suitable form of attachment that may depend on the brand of the vehicle.

Frame 102 includes one or more beams, plates, rods or the like and is movably coupled to the first arm 109 and the second arm 110. Specifically, frame 102 is pivotally coupled to an upper portion 111 of the first arm 104 and an upper portion 112 of the second arm 105.

Figure 2:
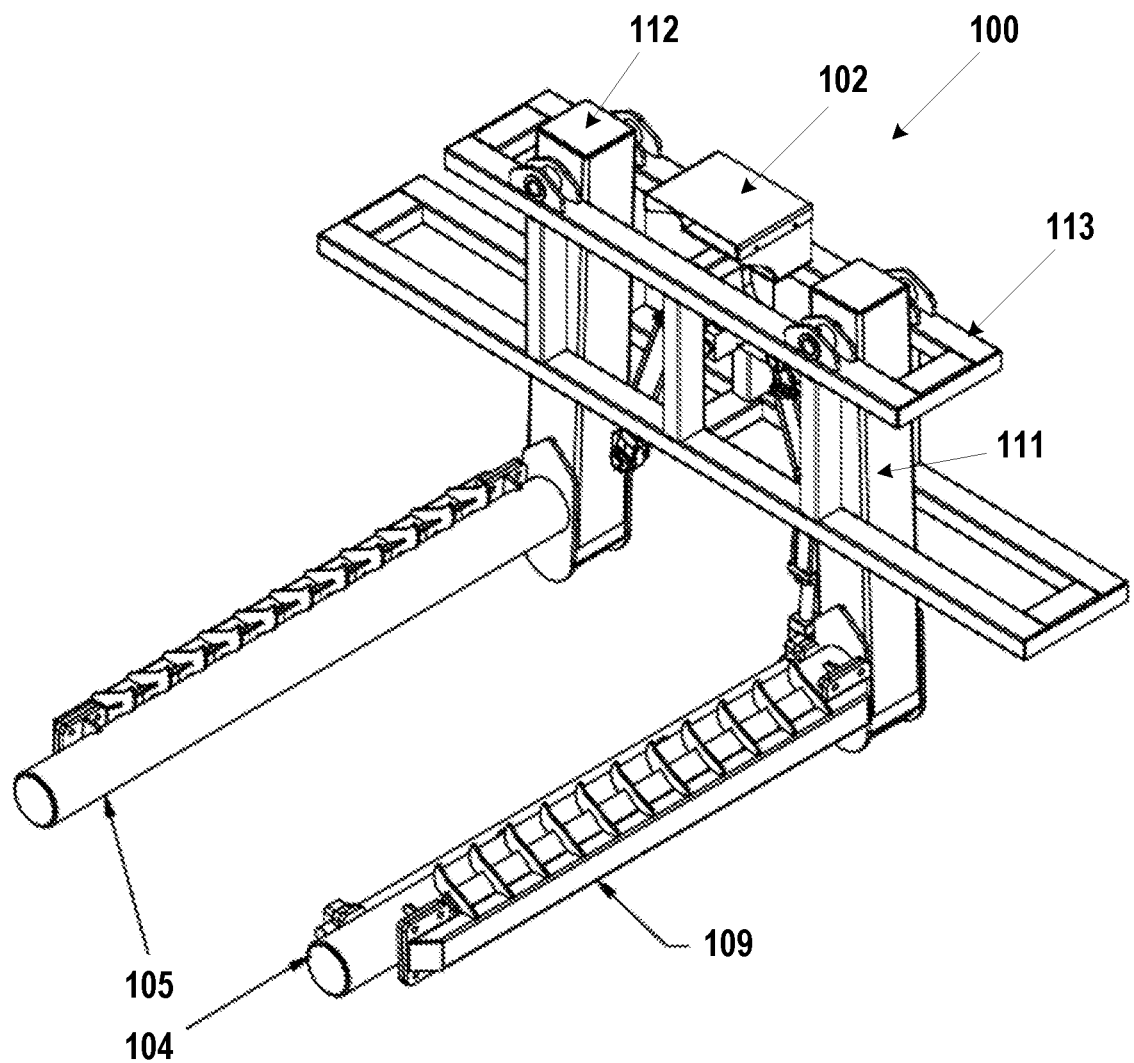
FIG. 2 shows a second elevated perspective view of the apparatus for removing net wrap from around a bale of FIG. 1.

As shown in FIGS. 1 and 2, each of the first arm 104 and the second arm 105 are pivotally coupled to the frame 102. It should be noted that although the figures herein show that both the first and second arms are movable relative to the frame 102, in some embodiments, only one of the first arm 104 and the second arm 105 may be movable relative to the frame 102.

In the embodiment shown in the figures, the first arm 104 and the second arm 105 are each pivotally coupled to an upper cross beam 113 of the frame 102. First arm 104 and second arm 105 can be pivoted under the power of hydraulic cylinders 114 and 115, respectively, about the pivot pins 116 and 117, respectively. In the embodiment shown in the figures, a first end of the first hydraulic cylinder 114 is pivotally coupled to a portion of the frame 102 and a second end of the first hydraulic cylinder 114 is pivotally coupled to an upper portion 111 of the first arm 104. Similarly, a first end of the second hydraulic cylinder 115 is pivotally coupled to a portion of the frame 102 and a second end of the second hydraulic cylinder 115 is pivotally coupled to an upper portion 112 of the second arm 105. It should be understood that although the cylinders described herein are described as being hydraulic cylinders, including but not limited to the first and second hydraulic cylinders 114 and 115, respectively, and cutting hydraulic cylinder 116, any of the cylinders described herein may also be electric cylinders.

It will be appreciated that the first arm 104 and the second arm 105 can be pivoted relative to the frame 102 by other means now known or hereafter developed. For example, in other embodiments, the first arm 104 and the second arm 105 may be pivoted relative to the frame 102 by linear actuators, motors, servomotors or the like.

Figure 3A:
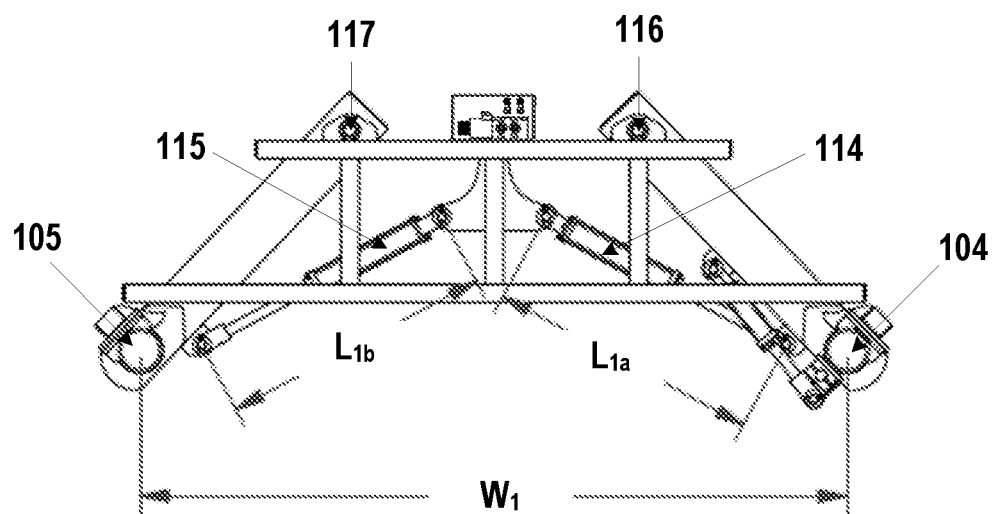
FIG. 3A shows a front view of the apparatus of FIG. 1 when the opposed arms are each in their extended position.
Figure 3B:
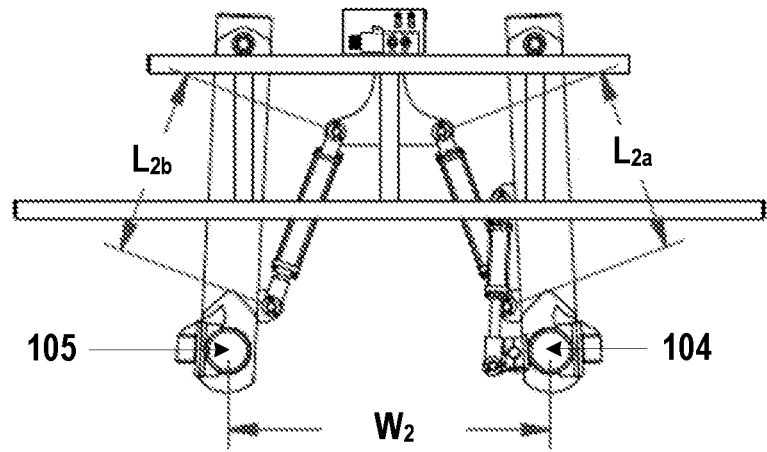
FIG. 3B shows a front view of the apparatus of FIG. 1 when the opposed arms are each in their retracted position.

Referring now to FIGS. 3A and 3B, illustrated therein are front views of the apparatus 100 of FIG. 1 when the first arm 104 and the second arm 105 are each in their retracted position (see FIG. 3B) and their extended position (see FIG. 3A).

In their retracted position, the first arm 104 and the second arm 105 are spaced apart by a distance $W_2$ that is less than a width (e.g. diameter) of a bale intended to have its net wrap removed therefrom (not shown). Accordingly, when the first arm 104 and the second arm 105 are each in their retracted position, a bale can be received by the arms 104, 105 and supported thereon above the ground.

When the first arm 104 and the second arm 105 are each in their extended position, the first arm 104 and the second arm 105 are spaced apart from each other by a distance $W_1$ that is greater than a width (e.g. diameter) of a bale. Accordingly, when the first arm 104 and the second arm 105 move from their retracted position to their extended position, the first arm 104 and the second arm 105 pass by one or more intermediate positions. When the first arm 104 and the second arm 105 reach their extended positions, the bale supported on the arms 104, 105 falls downwardly (e.g. by gravity) between the arms 104, 105 (e.g. to the ground or into a device for further processing (e.g. such as but not limited to a hay feeder or a bale processor)).

Apparatus 100 also includes a cutting mechanism 106 including a cutting element 108 and a cutting hydraulic cylinder 116. Cutting element 108 and cutting hydraulic cylinder 116 are each shown as being coupled to the first arm 104 in the embodiment shown in the figures, however, it should be understood that the cutting element 108 and cutting hydraulic cylinder 116 may also be coupled to the second arm 105.

Cutting element 108 is configured to cut net wrap around a bale when the cutting element 108 is moved from a lowered position to a raised position when the bale is supported on the first arm 104 and the second arm 105. In some embodiments, the cutting element 108 is configured to cut the net wrap at a position between the first arm 104 and the second arm 105 when the cutting element 108 reaches its raised position. In some embodiments, the cutting element 108 is configured to cut the net wrap at a position between the first grabbing mechanism 109 and the second grabbing mechanism 110 when the cutting element 108 reaches its raised position.

Cutting element 108 may extend along a length of a lower portion 121 of the first arm 104. In some embodiments, cutting element 108 may include a plurality of cutting knives 108a that are aligned along the lower portion of the first arm 104.

Figure 4B:
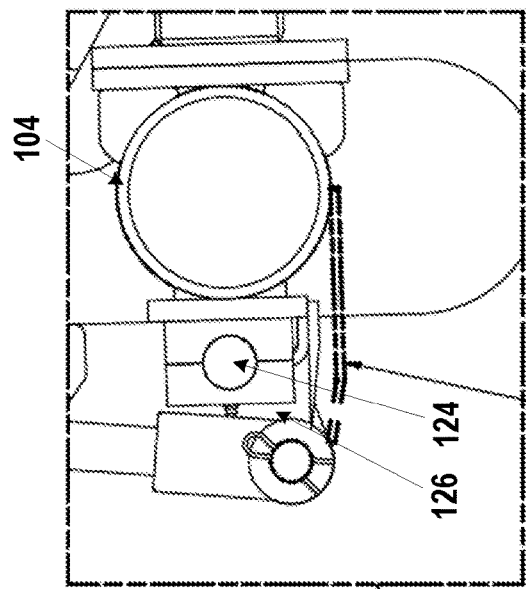
FIG. 4B shows a magnified front view of the cutting mechanism of the apparatus of FIG. 1 when the cutting element of the cutting mechanism is in its lowered position.
Figure 4D:
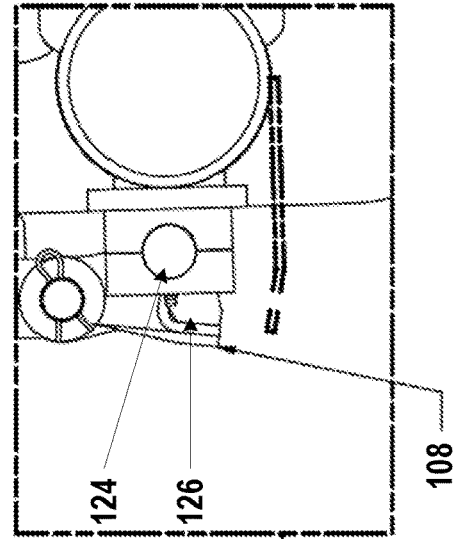
FIG. 4D shows a magnified front view of a cutting mechanism of the apparatus of FIG. 1 when the cutting element of the cutting mechanism is in its raised position.
Figure 4A:
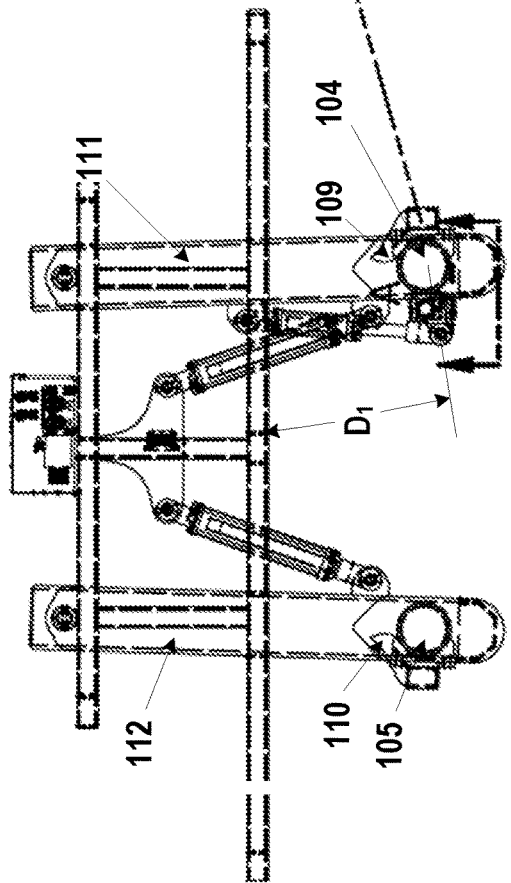
FIG. 4A shows a front view of the apparatus of FIG. 1 when the opposed arms are each in their retracted position and a cutting element of a cutting mechanism of the apparatus is in a lowered position.
Figure 4C:
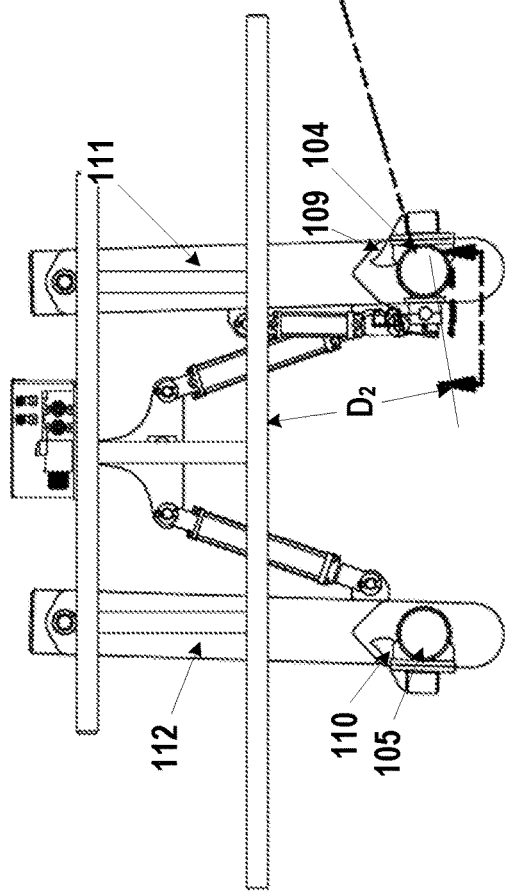
FIG. 4C shows a front view of the apparatus of FIG. 1 when the opposed arms are each in their retracted position and a cutting element of a cutting mechanism of the apparatus is in a raised position.
Figure 7:
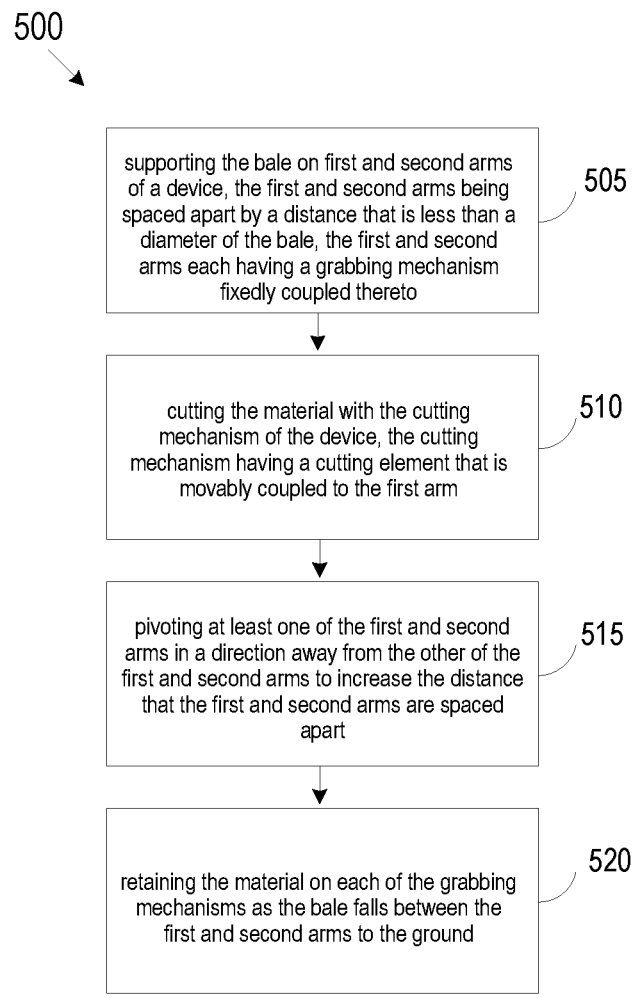
FIG. 7 is a block diagram showing a method of removing net wrap from a round bale, according to one embodiment.

In the embodiment shown in the figures, specifically shown in FIGS. 4A to 4D, in its lowered position, the cutting element 108 is positioned below at least a portion of the bale supported on the first and second arms 104, 105, respectively. As shown, cutting element 108 is coupled to a shaft 124 via a rod 126. As hydraulic cylinder 116 retracts upwardly, rod 126 pivots upwardly and rotates shaft 124 (e.g. in a clockwise direction as shown in FIGS. 4B and 4D). Rotation of shaft 126 rotates cutting element 108 from its lowered position to its raised position.

In its lowered position, a tip of cutting element 108 is spaced apart from a lowermost bar of the frame 102 by a distance $D_2$ and, in its raised position, the tip of cutting element 108 is spaced apart from a lowermost bar of the frame 102 by a distance $D_1$. Distance $D_1$ is generally in a range from about 12 inches to about 24 inches, or about 14 inches to about 20 inches, or about 18 inches. Distance $D_2$ is generally in a range from about 10 inches to about 20 inches, or about 12 inches to about 16 inches, or about 14 inches. In some embodiments, the tip of the cutting element 108 may travel a vertical distance of about 4 inches when moving from its lowered position to its raised position.

Apparatus 100 also includes first and second grabbing mechanisms 109 and 110, respectively. First grabbing mechanism 109 is coupled to the first arm 104 and the second grabbing mechanism 110 is coupled to the second arm 105. In some embodiments, first grabbing mechanism 109 is fixedly coupled to the first arm 104 and the second grabbing mechanism 110 is fixedly coupled to the second arm 105.

Each of the first grabbing mechanism 109 and second grabbing mechanism 110 is configured to retain the net wrap surrounding the bale after the net wrap is cut by the cutting element 108 and the at least one of the first arm 104 and second arm 105 is moved from its retracted position to its extended position and the bale falls downward.

As shown in the figures, each of the first grabbing mechanism 109 and second grabbing mechanism 110 may extend along a length of a lower portion of the first arm 104 and the second arm 105, respectively, and engage or abut the bale when the bale is supported on the lower portions of the first arm 104 and the second arm 105. In this manner, each of the first grabbing mechanism 109 and second grabbing mechanism 110 include a plurality of grabbing portions 128a that extend outwardly and upwardly relative to the lower portion of the first arm 104 and the lower portion of the second arm 105, respectively. Specifically, each of the first grabbing mechanism 109 and second grabbing mechanism 110 include a plurality of grabbing portions 128a that extend outwardly and upwardly relative to an uppermost surface of the lower portion of the first arm 104 and the lower portion of the second arm 105, respectively. In some embodiments, each of the grabbing portions 128a has a rounded back profile to provide for each grabbing portion 128a to slide into the bale without prematurely hooking the net wrap.

Referring now to FIGS. 5 and 6, illustrated therein are two additional embodiments of the first and second grabbing mechanisms 109, 110, respectively. In the previous embodiments, first and second grabbing mechanisms 109, 110 were both stationary. In the embodiments shown in FIGS. 5 and 6, first and second grabbing mechanisms 109, 110 may each include a moveable grabbing element 130 extending longitudinally along both of the arms 104, 105, to pinch the net wrap against a stationary grabbing element 131 also extending longitudinally along both of the arms 104, 105 before the first arm 104 and second arm 105 move away from each other to release the bale. As the bale is released, the net wrap is secured between the moveable grabbing element 130 and the stationary grabbing element 131 until the moveable grabbing element 130 is opened, releasing the net wrap.

In the embodiment shown in FIGS. 5A-5C, stationary grabbing element 131 of second grabbing mechanism 110 is shown extending inwardly from a base 132 supporting the stationary grabbing element 131 at a position that is laterally outward and upward relative to the second arm 105. Moveable grabbing element 130 is rotatably coupled to a rotatable element 133 such that at its first position (see FIG. 5B) the movable grabbing element 130 is below the stationary grabbing element 131 and below a bale supported on the second arm 105 and, at its second position (see FIG. 5C), the movable grabbing element 130 rotates upwardly and inwardly to retain a portion of the net wrap of the bale supported by on the second arm 105 between an upper portion 130a of the moveable grabbing element 130 and the grabbing portions 128a of the stationary grabbing element 131. In at least one embodiment, the moveable grabbing element 130 is powered by a cylinder such as but not limited to a hydraulic cylinder or an electric cylinder.

In the embodiment shown in FIGS. 6A-6C, the mechanism of action of the movable grabbing element 130 is similar to the mechanism of action as described with reference to FIGS. 5A-5C, however, in this embodiment, lower portion 130b of the moveable grabbing element 130 is shaped such that, upon rotating upwardly and inwardly to retain a portion of the net wrap between upper portion 130a of the moveable grabbing element 130 and the grabbing portions 128a of the stationary grabbing element 131, a greater surface area of the upper portion 130a rests against the grabbing portions 128a of the stationary grabbing element 131 to retain the net wrap therebetween. As described above, in the embodiment shown in FIGS. 6A-6C, the moveable grabbing element 130 may be powered by a cylinder such as but not limited to a hydraulic cylinder or an electric cylinder.

In both to the embodiments shown in FIGS. 5A-5C and 6A-6C, the moveable grabbing element 130 is from the second position to the first position to release the net wrap.

Referring now to FIGS. 7-12, illustrated therein is a block diagram of a method 500 of removing net wrap from a bale.

Step 505, shown schematically in FIGS. 8A to 9B, includes supporting a bale 200 on first 104 and second 105 arms of an apparatus 100. As noted above, the first and second arms 104, 105, respectively, are spaced apart by a distance $W_1$ that is less than or equal to a width (e.g. diameter) of the bale 200. The first and second arms 104, 105, respectively, each have a grabbing mechanism 109, 110, respectively fixedly coupled thereto.

As shown in FIG. 8A, the bale 200 can have a thickness T and a height H. Thickness T may be in a range of about 3 feet to about 5 feet, or be about 4 feet. Height H can be in a range from about 4 feet to about 6 feet, or be about 5 feet. As shown in FIG. 6B, at the retracted position, the arms 104 and 105 can be spaced by a distance $W_1$. $W_1$ may be in a range of about 3 feet to about 7 feet, or be about 5 feet.

As shown in FIG. 9A (magnified portion), the grabbing portions 128a may include a rounded back profile 129. The rounded back profile 129 may provide for the grabbing portions 128a to hook and slide into a bale without prematurely hooking the net wrap.

Step 510 includes cutting the net wrap with the cutting mechanism 106 of the apparatus 100. Cutting mechanism 106 includes a cutting element 108 that is movably coupled to the first arm 104. As shown in FIGS. 10A to 10D, the cutting element moves from a lowered position (see FIGS. 10A and 10B) to a raise position (see FIGS. 10C and 10D) to cut the net wrap of the bale 200. In the lowered position, the cutting element 108 is spaced from the bale 200. In the raised position, the cutting element 108 engages the bale 200 and cuts the net wrap of the bale 200. In some embodiments, the cutting mechanism 106 may include a shield 140. in some embodiments, such as but not limited to the embodiment shown in FIGS. 10A to 10D, the shield 140 may be disposed below and extend parallel to the cutting element 108 when the cutting element 108 is in its lowered position. Shield 140 may therefore protect a user working in close proximity to the cutting element 108 by inhibiting contact with the cutting element 108.

Figure 11B:
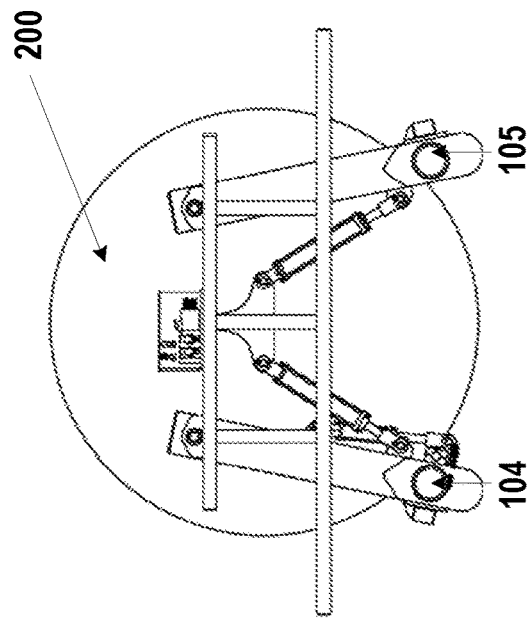
FIG. 11B shows a rear view of the apparatus of FIG. 1 with a bale supported on the first and second arms when the opposed arms are each in their retracted position.
Figure 11D:
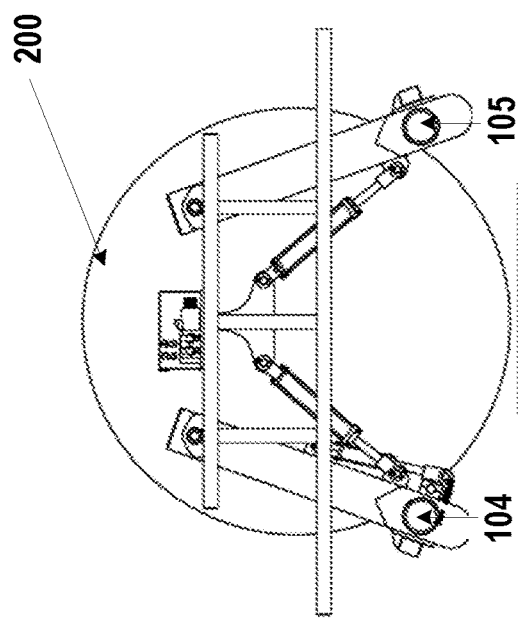
FIG. 11D shows a rear view of the apparatus of FIG. 1 with a bale supported on the first and second arms when the opposed arms are each moving towards their extended position.
Figure 11A:
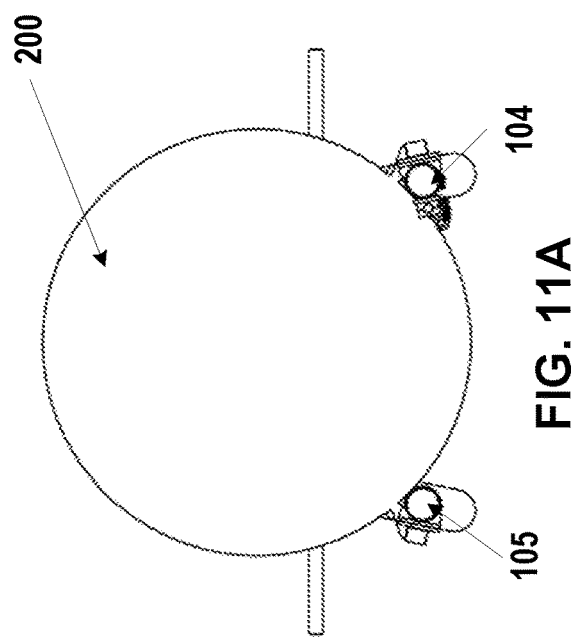
FIG. 11A shows a front view of the apparatus of FIG. 1 with a bale supported on the first and second arms when the opposed arms are each in their retracted position.
Figure 11C:
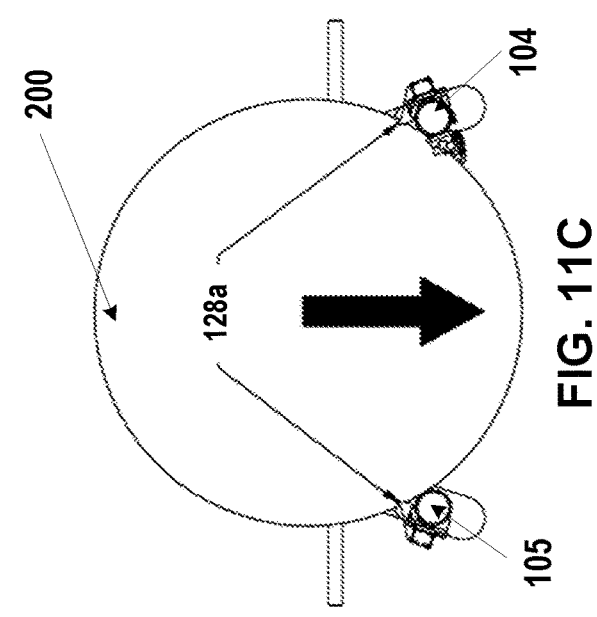
FIG. 11C shows a front view of the apparatus of FIG. 1 with a bale supported on the first and second arms when the opposed arms are each moving towards their extended position.

Step 515 includes pivoting at least one of the first and second arms 104, 105 in a direction away from the other of the first and second arms 104, 105 to increase the distance that the first and second arms 104, 105 are spaced apart. In this manner, as the first and second arms 104, 105 move away from each other from their respective retracted positions towards their respective extended positions, the first and second arms 104, 105 each move to an intermediate position between their retracted position and their extended position. FIGS. 11A and 11B show the first and second arms 104, 105 each at their retracted position and FIGS. 11C and 11D shown the first and second arms 104, 105 each at an intermediate position between their retracted position and their extended position. In some embodiments, the cutting element 108 may cut the net wrap when the first and second arms 104,105 are at their retracted positions. In other embodiments, the cutting element 108 may cut the net wrap when the first and second arms 104,105 are at an intermediate position between their retracted position and their extended position.

Step 520, shown schematically in FIGS. 12A to 12D, includes retaining the net wrap on each of the grabbing mechanisms as the bale falls downward between the first and second arms. FIGS. 12A and 12B shown the first and second arms 104,105 at an intermediate position between their retracted position and their extended position after the cutting element 108 has cut the net wrap. As the arms 104, 105 move away from their intermediate positions to their extended positions, as shown in FIGS. 12C and 12D, the net wrap 150 is retained by the grabbing portions 128a.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. An apparatus for removing net wrap from a bale, the apparatus comprising:
   a frame configured to releasably mount to a vehicle;
   first and second opposed arms coupled to the frame, at least one of the first and second opposed arms being configured to move between a retracted position where the first and second support arms receive and support the bale and an extended position where the bale passes between the support arms and falls downward;
   a cutting mechanism movably coupled to the first arm, the cutting mechanism including a cutting element, the cutting element being configured to rotate about an axis defined by the first arm to move from a lowered position to a raised position to cut the net wrap; and
   at least one grabbing mechanism coupled to the first arm or the second arm, the at least one grabbing mechanism being configured to retain the net wrap after the net wrap has been cut by the cutting mechanism and the at least one of the first and second opposed arms moves from the retracted position towards the extended position and the bale falls downward.

2. The apparatus of claim 1, wherein the cutting element extends along a length of the first arm.

3. The apparatus of claim 1, wherein the cutting element includes a plurality of individual cutting knives that are aligned with each other.

4. The apparatus of claim 1, wherein each of the first arm and the second arm is configured to move between the retracted position where the first and second support arms are spaced apart by a first distance that is less than a diameter of the bale and the extended position where first and second support arms are spaced apart by a distance that is greater than the diameter of the bale.

5. The apparatus of claim 1, wherein the at least one grabbing mechanism includes a first grabbing mechanism that extends along the first arm and a second grabbing mechanism that extends along the second arm.

6. The apparatus of claim 5, wherein the first grabbing mechanism is fixedly coupled to the first arm and the second grabbing mechanism is fixedly coupled to the second arm.

7. The apparatus of claim 1, wherein the cutting element is configured to cut the net wrap at a position between the first arm and the second arm when the bale is supported on the first arm and the second arm.

8. The apparatus of claim 1, wherein the cutting mechanism is configured on the first arm to cut the net wrap at a position between the first grabbing mechanism and the second grabbing mechanism when the bale is supported on the first arm and the second arm.

9. The apparatus of claim 1, wherein the cutting mechanism includes a cutting cylinder for pivotally moving the cutting element relative to the first arm to cut the net wrap.

10. The apparatus of claim 9, wherein the cylinder is fixedly coupled to an upper portion of the first arm.

11. The apparatus of claim 1 further comprising a first cylinder and a second cylinder, the first cylinder being pivotally coupled to the frame and to the first arm to move the first arm between the retracted position and the extended position and the second cylinder being pivotally coupled to the frame and to the second arm to move the second arm between the retracted position and the extended position.

12. The apparatus of claim 1, wherein the at least one grabbing mechanism includes a movable grabbing element and a stationary grabbing element, the moveable grabbing element movable between a first position and a second position to retain the net wrap between the movable grabbing element and the stationary grabbing element.

13. The apparatus of claim 12, wherein the movable grabbing element rotates to move between the first position and the second position.

14. A method of removing net wrap from a bale, the method comprising:
supporting the bale on first and second arms of an apparatus, the first and second arms being spaced apart by a distance that is less than a diameter of the bale, at least one of the first and second arms having a grabbing mechanism fixedly coupled thereto;
cutting the net wrap with a cutting mechanism of the apparatus, the cutting mechanism having a cutting element that is movably coupled to the first arm, the cutting element being configured to rotate about an axis defined by the first arm to move from a lowered position to a raised position to cut the net wrap;
pivoting at least one of the first and second arms in a direction away from the other of the first and second arms to increase the distance that the first and second arms are spaced apart; and
retaining the net wrap the at least one grabbing mechanism as the bale falls downwardly between the first and second arms.

15. The method of claim 14, wherein cutting the net wrap includes cutting the net wrap along a width of the bale.

16. The method of claim 14, wherein cutting the net wrap includes pivoting the cutting element relative to the first arm between a lowered position where the cutting element is spaced from the bale and a raised position where the cutting element engages the net wrap and cuts the net wrap wrapped around the bale.

17. The method of claim 14, wherein pivoting at least one of the first and second arms in the direction away from the other of the first and second arms includes pivoting at least one of the first and second arms by actuating a first cylinder pivotally coupled to the frame.

18. The method of claim 14, wherein pivoting at least one of the first and second arms in the direction away from the other of the first and second arms includes pivoting each of the first and second arms in a direction away from the other of the first and second arms.

19. An apparatus for removing net wrap from a bale, the apparatus comprising:
a frame configured to releasably mount to a vehicle;
first and second opposed arms coupled to the frame, at least one of the first and second opposed arms being configured to move between a retracted position where the first and second support arms receive and support the bale and an extended position where the bale passes between the support arms and falls downward;
a cutting mechanism movably coupled to the first arm, the cutting mechanism including a cutting element, the cutting element being configured to move relative to the first arm to cut the net wrap; and
at least one grabbing mechanism coupled to the first arm or the second arm, the at least one grabbing mechanism being configured to retain the net wrap after the net wrap has been cut by the cutting mechanism and the at least one of the first and second opposed arms moves from the retracted position towards the extended position and the bale falls downward, the at least one grabbing mechanism including a movable grabbing element and a stationary grabbing element, the movable grabbing element movable between a first position and a second position to retain the net wrap between the movable grabbing element and the stationary grabbing element.

* * * * *